Dec. 24, 1946.   S. W. SEELEY   2,413,080
SPECTROPHOTOMETER
Filed Nov. 16, 1940   2 Sheets-Sheet 1
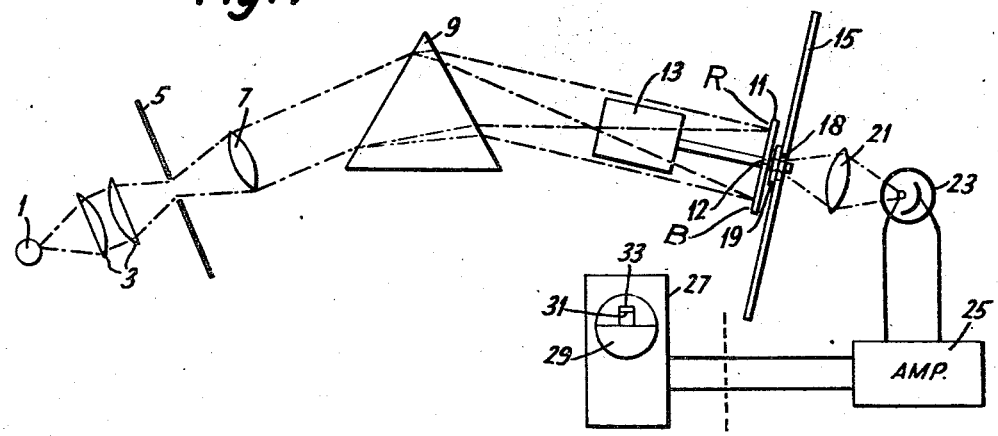
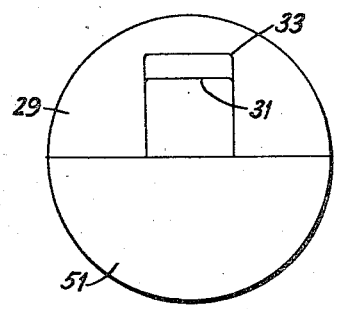
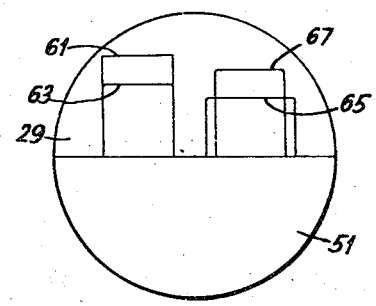
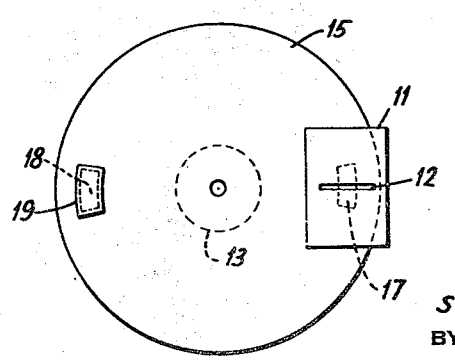
INVENTOR
STUART W. SEELEY
BY
ATTORNEY

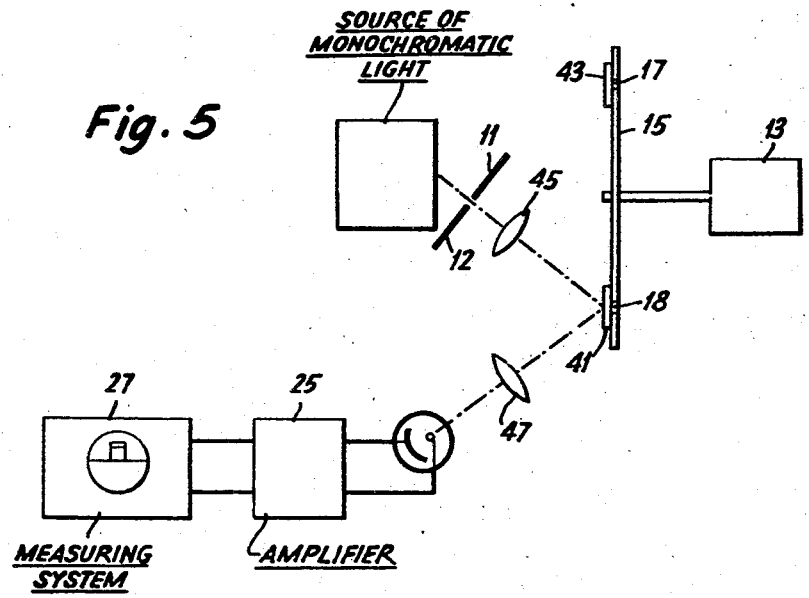
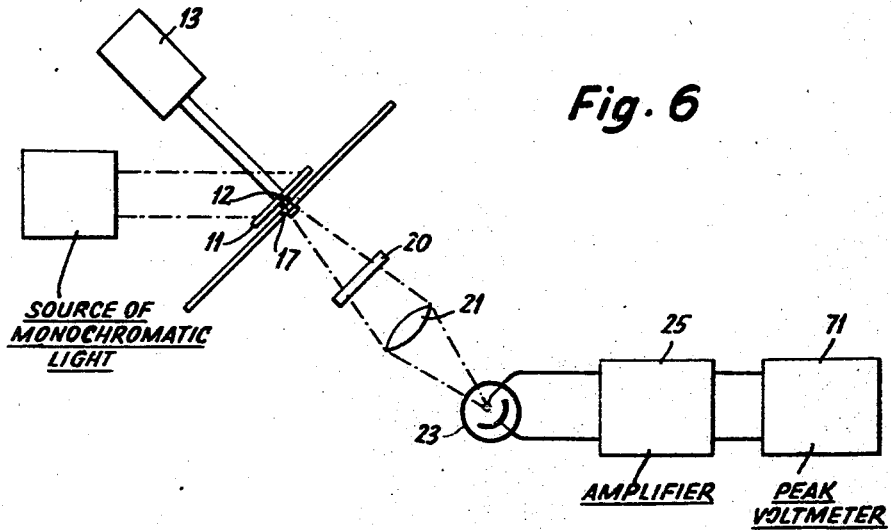

Patented Dec. 24, 1946

2,413,080

UNITED STATES PATENT OFFICE 2,413,080

SPECTROPHOTOMETER

Stuart W. Seeley, Roslyn, N. Y., assignor to Radio Corporation of America, a corporation of Delaware Application November 16, 1940, Serial No. 365,875

14 Claims. (Cl. 88—14)

1

This invention relates to optical devices, and in particular, relates to a new method of and apparatus for measuring spectral response of transmitting and reflecting media.

It is often necessary to measure the spectral transmission characteristics of filters, glass, plastics and other materials, as well as to measure the spectral reflectance characteristics of the materials. Generally, this is known as the characteristic spectral absorption of the medium, absorption being equally applicable to transmission or reflectance. The methods and apparatus known in the prior art for measuring such characteristics were, generally speaking, extremely complicated in order to reduce the amount of labor involved in obtaining such information, or, in some cases, where apparatus of a more simple nature was provided, an enormous amount of laborious manual manipulation became necessary to obtain desired results.

By my invention, there is provided a method and means for rapidly measuring the spectral transmission or reflectance characteristic of light absorbing material which requires only a minimum of apparatus and a minimum amount of manual manipulation.

In accordance with my invention, a source of substantially monochromatic light, whose frequency or wave length may be varied, is directed alternately upon a photosensitive device along two paths, of which one path transmits light whose intensity is to be considered as representing a comparison standard, and of which the other path transmits the light with its intensity determined by the absorption characteristics of the material to be measured.

The output energy which results from the photosensitive device from the alternately impinging light energies, following suitable amplification, if necessary, is fed to an amplitude measuring system capable of differentiating the two energy amplitude outputs from the photosensitive device. The transmission or reflection co-efficient of the material investigated is then obtained by measuring the ratio of the two amplitudes. It will be appreciated, therefore, that it is only necessary to vary the frequency or wave length of the monochromatic source and to measure the ratio of the signal resulting from the light passing along the standard companion path relative to the signal output resulting from the light travelling over the path including the sample to be measured in order to obtain a spectral characteristic in which the abscissa, for example, would be frequency or wave length of light

2 and the ordinate would represent the percentage absorption by transmission or reflectance of the tested medium, as the case may be. By utilizing the method of obtaining the ratio of the light transmission over the standard path to the transmission over the path including the material to be measured, minimum apparatus and minimum manual manipulation only are necessary to obtain this vital data.

It will thus be appreciated that the main object of my invention is to provide a new, novel and useful method and apparatus suitable for carrying out the method for obtaining spectral absorption characteristics of material.

Another object of my invention is to provide new and novel spectrophotometers.

A still further object of my invention is to provide an easy method for measuring the light transmission characteristic of light filters, which are particularly useful in color television, photography, sorting devices, printing and other fields.

Another object of my invention is to provide a method and apparatus for measuring the reflectance of materials.

Another object of my invention is to provide a new and novel electro-optical spectrophotometer requiring a minimum amount of apparatus and yet capable of providing precise results rapidly and easily.

Other objects of my invention will become apparent upon a reading of the following detailed description of my invention when taken together with the drawings.

In the drawings,

Fig. 1 shows schematically one form of apparatus suitable for carrying out my new and novel method of measuring the spectral characteristics of both transmitting and reflecting media.

Fig. 2 shows in somewhat more detail an apertured disk suitable for use with my invention, together with its relation to an apertured diaphragm, Fig. 3 and Fig. 4 are graphs indicative of the type of signal response obtained when using an oscillograph according to my invention, Fig. 5 shows a modification of the embodiment of my invention when the reflectance characteristic is to be measured, and Fig. 6 shows a further modification using a peak voltmeter as an indicating instrument.

In the drawings, I have indicated schematically a means for obtaining substantially monochromatic light. A light source 1 has part of its flux collected by the condenser 3 and brought to focus on the slit 5. The optical system shown symbolically at 7 serves to direct the light through the prism 9, the slit 5 being placed at the principal focus of the optical system 7. The prism deviates and disperses the light to provide a spectrum on the diaphragm 11, the red end of the spectrum being positioned at R and the blue end of the spectrum being positioned at the point B.

A slit 12 in the diaphragm 11 is made adjustable so as to be able to be moved normal to the light falling thereon. This may be accomplished conveniently by providing for transverse adjustment of the diaphragm 11 with respect to the light path. By making the slit very narrow, substantially a monochromatic source of light will be provided. A lens 21 serves to focus the slit upon the photosensitive device which may, for example, be a photoelectric cell. Interposed between the slit and photocell is a disk 15 driven by a motor 13. The disk is provided with two diametrically opposed apertures 17 and 18, as shown in Fig. 2, if the spectral transmission of a material is to be measured. The material 19, whose transmission characteristic is to be measured, is mounted over the aperture 18. The output of the photosensitive device is suitably amplified by the amplifier 25 and the output of the amplifier is fed to a cathode ray oscillograph 27 provided with means for sweeping the beam of the cathode ray across the screen 29 in synchronism with the incoming signals. Such oscillographs are well known in the art, of which the type RCA 136B is representative.

By making the sweep frequency of the oscillograph equal to twice the number of revolutions of the disk per second, alternate electrical pulses, produced when the light passes through the apertures 17 and 18 and falls on the photoelectric cell 23, will appear as superimposed images on the screen 29 of the oscillograph 27 as traces 31 and 33 respectively. This is shown in somewhat greater detail in Fig. 3.

It will be appreciated that the light passing through the aperture 17 and being unimpeded, will produce a larger impulse than when the light passes through the absorbing medium 19 and aperture 18. As a result, the amplitudes 31 and 33, assuming a linear amplifier and deflecting system, are directly proportional to the intensity of the energy falling on the photoelectric cell and the ratio of the two amplitudes, i. e., the amplitude 31 divided by the amplitude 33 is the transmission factor for the particular wave length of the monochromatic light of the medium or material 19. By shifting the slit to select a different wave length point, light pulses of a different amplitude are obtained but the ratio of the pulses will continue to give the transmission factor of the material 19. By advancing the slit from one end of the spectrum to the other and ascertaining the ratio for each position of the slit, there will, therefore, be obtained the transmission factor as a function of the wave length of light.

It is to be noted, particularly, that by this system, it is unnecessary to have specific information of the spectral emission quality of the light source 1 or the spectral response characteristic of the photoelectric device 23. That is to say, no energy corrections are necessary for the light source or the photosensitive device, since the pulse produced when the light passes through 17 is over a standard path, and since the path upon rotation of the disk 15 to bring the aperture 18 into alignment is identical, save for the material 19 being interposed therein, the reduction in the pulse is due only to the insertion of the medium 19. The ratio of the pulse passing through 19 and the aperture 18 to the pulse produced by the light passing through 17 is, therefore, a true measure of the transmission of the medium 19.

If it is desired to measure the total transmission from a light source 1, then it is only necessary to remove the prism 9 and arrange for the light from the source 1 to fall on the slit of the diaphragm 11. The ratio of the two pulses will then be the total transmission of the material 19. Where it is desired to measure the reflectance of the material, the disk 15 has positioned over the apertures, for example, if it is undesired to provide a separate disk, a reflecting surface 41, which, for comparison purposes, may be considered as the standard, and the material 43 which is under investigation. Light from the slit 12 is focused by the optical system 45 along a path to fall first upon the surface 41 (which may be considered herein as the "standard path") and the reflected light picked up by the optical system 47 and focused on the photoelectric cell 23. A surface formed of magnesium oxide, for example, which has substantially uniform reflectance as a function of wave length of light over the entire visible spectrum, and which reflects approximately 98% of the light impinging thereon, is utilized as the standard surface. When the disk 15 is rotated, the light path remains the same, but the light issuing through the aperture 12 now falls alternately upon the standard surface 41 and the surface 43 which is under test. The output energy of the photoelectric cell, as varied by the transmission or reflectance characteristics of surfaces 41 or 43, is fed through the amplifier 25 to deflect vertically the electron beam in the cathode ray oscillograph 27 so as to produce superimposed images of the energy output of the photoelectric device as varied by each of surfaces 41 and 43. The ratio of the heights of each output energy representation indicates the percentage reflectance of the sample 43 under test, as compared to the reflectance of the standard surface 41. Since the magnesium oxide has a constant reflectance through the spectral band, if the absolute value of reflectance is not desired the ratio between the heights of the energy pulses produced from the photoelectric device 23 when the light is reflected from the standard 41 and the sample 43 gives a measure of the relative reflectance. If, however, the absolute reflectance of the material is desired, then it is only necessary to multiply the ratio obtained by a constant factor, which factor is characteristic of the reflectance of the standard 41.

An alternative method and circuit is shown in Fig. 6 wherein a peak voltmeter 71 is substituted for the oscillograph 27. This modification is useful where it is desired not to affix to the disk 15 the light absorbent material under test. Under such conditions, the absorbent material 20 in Fig. 6 is placed in the path of the light beam, as for example, passing through the slit 12 intermediate the slit and the photocell 23. Under these conditions, the peak voltmeter gives an indication which is proportional to the light intensity falling on the photoelectric cell.

Following the reading of the peak voltmeter 71 the light absorbing material 20 is removed from the path and the peak voltmeter read again, the reading this time being proportional to the light which passes through the slit 12. The ratio of the two peak voltmeter readings is the percentage transmission of the light absorbing material 20.

It will be appreciated that this method of measurement is convenient and very rapid and can be used where the light intensity and the supply voltages to the amplifier and the photoelectric cell are substantially constant since the method presupposes that the overall system is constant during the time the two different sets of readings are taken.

If it is desired, the system may be extended by increasing the number of apertures, for example, to four, where it is desired to test the transmission characteristic of a tri-color separation set of filters, such as is useful in color television or in making color separation negatives for color print reproductions.

Under these conditions, if the apertures are symmetrically located, a trace of the form shown in Fig. 4 will be produced and by making one of the apertures slightly wider than the others, a marker aperture is readily provided since this only increases the duration of the pulse, but not its amplitude. The trace of greatest amplitude 61, of course, will be that of the aperture having no filter in front of it. The trace 63 will be the response of the filter placed diametrically opposite to the standard aperture, while the trace 65 will be produced by the filter placed over the widest of the apertures, and the trace 67 will be representative of the filter placed over the aperture diametrically opposite to the widest aperture. The transmission characteristic, therefore, of the three filters will be given by the ratios of 63/61, 65/61 and 67/61.

It will be readily appreciated that this method of measuring the characteristics of a plurality of filters and in a like fashion, of reflecting mediums, can be extended by varying the width of the apertures or the samples of the reflectors so as to give indicia of each of the samples being measured. Where a large number of apertures are provided the ascertaining of the spectral characteristics is speeded up, since for each setting of the slit 11 corresponding to each wave length of light, a large number of observations may be made, since one traversal of the slit through the spectrum provides information on a number of different samples.

It will, of course, be appreciated that photometric filters of the type known as Wratten No. 78a, 78b, 78c as well as 81a, 81b and 81c may be interposed between the light source and the prism to change the quality of light so as to make possible the use of an ordinary tungsten lamp and yet obtain light of daylight quality, as is well known in the art, or to provide the characteristic spectral emission of other sources, such as, for example, low color temperature illuminants.

Having described my invention, what I claim is:

1. The method of measuring the light absorption characteristic of a material which comprises directing light along a predetermined path to a focal plane, periodically deriving electrical energy representative of the light arriving at said focal plane, periodically interposing the material whose absorption is to be measured in said light path, both of the periods being shorter than the duration of the persistency of vision, deriving electrical energy representative of the light arriving at said focal plane when said material is inserted, and determining the degree of inequality between the two derived energies.

2. The method of obtaining spectral absorption characteristic of a material which comprises the steps of producing a source of substantially monochromatic light, directing light from the source along a predetermined path to a focal plane periodically deriving electrical energy representative of the light arriving at said focal plane, periodically interposing the material whose absorption is to be measured in said light path, both of the periods being shorter than the duration of the persistency of vision, deriving electrical energy representative of the light arriving at said focal plane when said material is inserted, comparing the two derived energies, varying the wave length of the monochromatic light, and determining the degree of inequality between the two derived energies for each variation of wave length of light.

3. The method of measuring the light transmission characteristic of a material, which comprises directing light along a predetermined path to a focal plane, periodically deriving electrical energy representative of the light arriving at said focal plane, periodically interposing the material whose transmission is to be measured in said light path, both of the periods being shorter than the duration of the persistency of vision, deriving electrical energy representative of the light transmitted through said material to said focal plane, and determining the degree of inequality between the two derived energies.

4. The method of obtaining spectral transmission characteristic of a material which comprises the steps of producing a source of substantially monochromatic light, directing light from the source along a predetermined path to a focal plane, periodically deriving electrical energy representative of the light arriving at said focal plane, periodically interposing the material whose transmission is to be measured in said light path, both of the periods being shorter than the duration of the persistency of vision, deriving electrical energy representative of the light transmitted through said material to said focal plane, comparing the two derived energies, varying the wave length of the monochromatic light, and determining the degree of inequality between the two derived energies for each variation of wave length of light.

5. The method of measuring the light reflectance characteristic of a material, which comprises directing light along a predetermined path to a focal plane, periodically deriving electrical energy representative of the light arriving at said focal plane, periodically interposing the material whose reflectance is to be measured in said light path, both of the periods being shorter than the duration of the persistency of vision, deriving electrical energy representative of the light reflected from said material to said focal plane, and comparing the two derived energies.

6. The method of obtaining spectral reflectance characteristic of a material which comprises the steps of producing a source of substantially variable monochromatic light, directing light from the source along a predetermined path to a focal plane periodically deriving electrical energy representative of the light arriving at said focal plane, periodically interposing the material whose reflectance is to be measured in said light path, both of the periods being shorter than the duration of the persistency of vision, deriving electrical energy representative of the light reflected from said material to said focal plane, comparing the two derived energies, varying the wave length of the monochromatic light, and comparing the two derived energies for each variation of wave length of light.

7. A spectrophotometer comprising means for producing and directing a beam of light along a predetermined path to a focal plane, means for periodically deriving electrical energy representative of the light arriving at said focal plane, means for periodically interposing material whose absorption is to be measured in said light path, both of the periods being shorter than the duration of the persistency of vision, means for deriving electrical energy representative of the light arriving at said focal plane when said material is interposed in the said light path, and means for determining the degree of inequality between the two derived energies.

8. A spectrophotometer comprising a source of light, means for directing light from said source along a predetermined path to a focal plane, means to select a portion of the directed light, means for periodically deriving electrical energy representative of the selected light arriving at said focal plane, means for periodically interposing material whose absorption is to be measured in said light path, both of the periods being shorter than the duration of the persistency of vision, means for deriving electrical energy representative of the light arriving at said focal plane when said material is inserted, and means for determining the degree of inequality between the two derived energies.

9. A spectrophotometer comprising a source of light, means for directing light from said source along a predetermined path to a focal plane, means to select a portion of the directed light, means for periodically deriving electrical energy representative of the selected light arriving at said focal plane, means for periodically interposing material whose absorption is to be measured in said light path, both of the periods being shorter than the duration of the persistency of vision, means for deriving electrical energy representative of the light arriving at said focal plane when said material is inserted, and oscillographic means to produce stationary images under the control of the said derived energies for determining the degree of inequality between the two derived energies.

10. A spectrophotometer comprising a source of light, means for directing light from said source along a predetermined path to a focal plane, means to select a portion of the directed light, means for periodically deriving electrical energy representative of the selected light arriving at said focal plane, means for periodically interposing material whose absorption is to be measured in said light path, both of the periods being shorter than the duration of the persistency of vision, means for deriving electrical energy representative of the light arriving at said focal plane when said material is inserted, and peak voltmeter means for comparing the two derived energies.

11. A spectrophotometer comprising a source of light, means for directing light from said source along a predetermined path to a focal plane, means interposed in said path for producing substantially monochromatic light, means comprising a continuously rotating element for alternately deriving electrical energy representative of the monochromatic light arriving at said focal plane and for interposing material whose absorption is to be measured in said light path for deriving electrical energy representative of the light arriving at said focal plane when said material is inserted, and means for determining the degree of inequality between the two derived energies, the period of alternation being less than the duration of the persistency of vision.

12. A spectrophotometer comprising a source of light, means for directing light from said source along a predetermined path to a focal plane, means to select a portion of the directed light, photoelectric means for receiving light from said focal plane, continuously rotating means for periodically interrupting the light received at said photoelectric means and for interposing material whose absorption is to be measured in said light path, and oscillographic means connected to said photoelectric means to produce stationary visual traces corresponding to the intensity of light arriving at said focal plane for determining the degree of inequality between the intensity of the said portion of light and the intensity of the light passing through the said material.

13. A spectrophotometer comprising means to provide substantially monochromatic light, a rotatable disc of opaque material having a pair of diametrically opposed openings spaced from the axis thereof, means associated with one of said openings for temporarily holding material whose absorption is to be measured in position to cover the opening, means to rotate said disc, photoelectric means positioned to receive light projected alternately through said openings as said disc is rotated, an oscillograph having means therein to produce a visible trace pattern, said last named means being operatively connected to said photoelectric means, the sweep frequency at which said oscillographic means operates being equal to twice the speed expressed in revolutions per second of the disc so that stationary visual superimposed traces will be produced on the oscillograph having trace amplitudes representing light intensities alternately incident on the photocell from said source through said openings.

14. A spectrophotometer comprising a light source, a diaphragm having a restricted opening, a prism for dispersing light from said light source to provide a spectrum on said diaphragm, said diaphragm being movable longitudinally of the spectrum thereby to select a band of substantially monochromatic light, a rotatable disc of opaque material having a pair of diametrically opposed openings spaced from the axis thereof, means associated with one of said openings for temporarily holding material whose absorption is to be measured in position to cover the opening, means to rotate said disc, photoelectric means positioned to receive the substantially monochromatic light projected alternately through said openings as said disc is rotated, an oscillograph having means therein to produce a visible trace pattern, said last named means being operatively connected to said photoelectric means, the sweep frequency at which said oscillographic means operates being equal to twice the speed expressed in revolutions per second of the disc so that stationary visual superimposed traces will be produced on the oscillograph having trace amplitudes representing light intensities alternately incident on the photocell from said source through said openings.

STUART W. SEELEY.